Patented Sept. 3, 1935

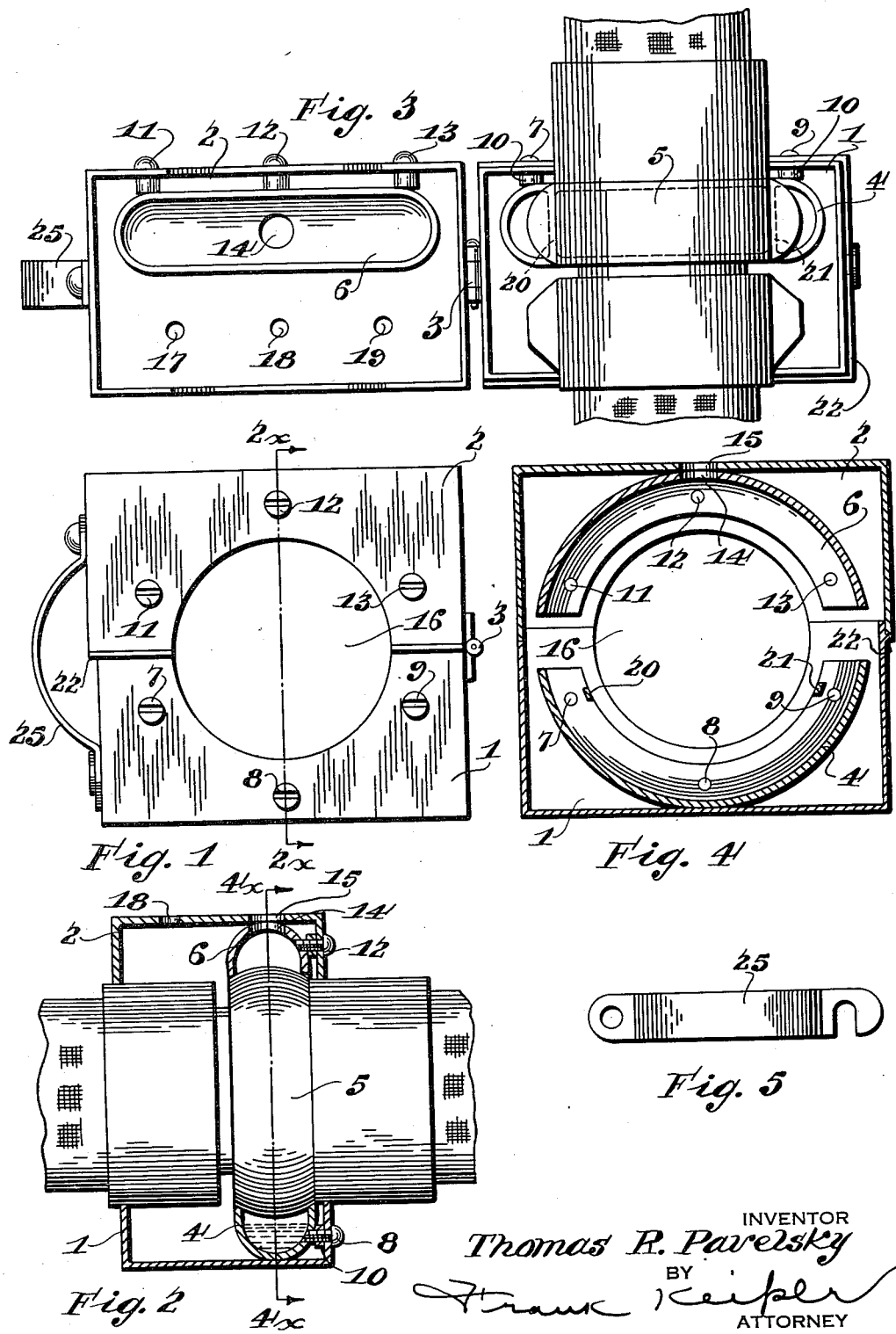

2,013,315

UNITED STATES PATENT OFFICE 2,013,315

DEVICE FOR HEATING HOSE COUPLINGS

Thomas R. Pavelsky, Rochester, N. Y.

Application October 10, 1934, Serial No. 747,762

3 Claims. (Cl. 137—72)

It will be understood that the fireman's hose is laid from the water supply to the fire in a continuous line that includes many sections of hose that are coupled together with metal couplings. After the fire has been put out it is customary to uncouple these sections and roll each section up separately for the purpose of taking it back to quarters. In the winter time the metal couplings freeze up so that it is impossible in very cold weather to uncouple the sections.

My invention has for its object to provide a device that can be applied directly to a hose coupling, more especially the coupling of a fireman's hose, for the purpose of thawing it out.

An object of my invention is to provide a device or box that is made of two sections hinged together that can be opened and put in place at the coupling, and then closed around the coupling.

Another object of the device is to make it in such manner that a small amount of gasoline can be placed therein and burnt therein, causing the generation of heat enough to heat the coupling and thaw it out.

Another object of the invention is to provide a device that can be closed around the coupling and yet have sufficient air draft therein to permit the ready burning of the gasoline for the purpose of heating the coupling.

These and other objects of the invention will be illustrated in the drawing, described in the specification and pointed out in the claims at the end thereof.

In the drawing:

Figure 1 is a side elevation of my heating device.

Figure 2 is a vertical section on the line $2x$—$2x$ of Figure 1, showing the hose coupling in place in the heating device.

Figure 3 is a top plan view of the coupling with the two parts thereof spread open.

Figure 4 is a vertical section on the line $4x$—$4x$ of Figure 2 the hose coupling being omitted and the two parts of the heating device being shown closed together as demonstrated in Figure 1.

Figure 5 is a detail view of the handle or strap by which the two parts are held together at the open end.

In the drawing like reference numerals indicate like parts.

As shown in the drawing, my heating device comprises two parts, which will be referred to as a lower section 1 and an upper section 2, which sections are connected together by the hinge 3. These sections can be closed one on the other and form a box. Two of the upright parallel sides of each section are cut away with a semi-circular opening which, when the sections are brought together, form circular openings 16, 16 that are adapted to receive or close around the hose coupling.

In the lower section is placed a semicircular channel or trough 4, concentric with the opening 16, in which the ring 5 on the female part of the coupling is adapted to rest. In the upper section 2 a corresponding channel or hood 6 is provided, which is adapted to embrace or cover over the ring 5 referred to. When the upper section is closed on the lower section, as shown in Figure 4, these two channels form a mutilated circular trough that nearly surrounds the ring 5. The ends of the trough sections do not quite abut, but an open space is left at each side thereof to provide clearance for ventilation or accumulation of ice, etc. The channel 4 is attached to one side of the section 1 by three screws 7, 8 and 9 which extend through the side and engage the trough. The trough is spaced away from the side by means of collars 10 interposed around the screws and between the trough and the side. Similar screws 11, 12 and 13 are used to hold the upper channel 6 in place and support it from the side of the upper section 2. The channel 6 has an opening 14 at the top thereof which registers with a similar opening 15 in the top of the section 2, through which air or the products of combustion can pass. Additional air holes 17, 18 and 19 are provided in the top section for ventilation.

In the lower channel 4 is provided bridges 20 and 21 on which the lugs provided on the ring 5 of the hose coupling are adapted to rest and by which the coupling is held accurately in place. A shoulder 22 is provided on the lower section of the side opposite the hinge on which the lower edge of the upper section is adapted to engage or rest.

A handle 25 is provided, pivoted on the upper section and adapted to engage with the lower section, by which the box may be carried.

In practice this device is opened and placed on the ground at the side of the coupling to be heated. A spoonful of gasoline is placed in the lower trough 4. This gasoline is then set on fire and the coupling and the hose is lifted and the coupling is dropped into place in the lower section. The upper section is then closed on the lower section and left there. By the time the gasoline has burnt itself out, or shortly thereafter, the coupling has been heated enough to thaw it out so that the box can be opened, and the coupling can be removed, and the wrenches can be applied to the coupling to unscrew the parts thereof.

I claim:

1. In a box adapted to be used for heating a hose coupling, the combination of two box halves connected with a hinge, two of the parallel sides of said box having openings therethrough adapted to receive the members of a hose coupling therein, said box being divided diametrically across said opening and in line with said hinge, said box being adapted to be opened, and being adapted to receive a hose coupling therein with the box closed around it, said box being adapted to hold burning fuel therein, with openings in the top of the box for ventilation.

2. In a box adapted to be used for heating a hose coupling, the combination of two box halves connected with a hinge, two of the parallel sides of said box having openings therethrough adapted to receive the members of a hose coupling therein, said box being divided diametrically across said opening and in line with said hinge, said box being adapted to be opened, and being adapted to receive a hose coupling therein with the box closed around it, a semicircular trough in the lower half of the box, over which a portion of the hose coupling is adapted to rest, said trough being adapted to receive a combustible fuel that will burn and heat the coupling.

3. In a box adapted to be used for heating a hose coupling, the combination of two box halves connected with a hinge, two of the parallel sides of said box having openings therethrough adapted to receive the members of a hose coupling therein, said box being divided diametrically across said opening and in line with said hinge, said box being adapted to be opened, and being adapted to receive a hose coupling therein with the box closed around it, a semicircular trough in the lower half of the box, over which a portion of the hose coupling is adapted to rest, said trough being adapted to receive a combustible fuel that will burn and heat the coupling, a semicircular hood in the upper half of the box in line with the semicircular trough in the bottom of the box, a draft opening through said hood and through the top of the box.

THOMAS R. PAVELSKY.